(12) United States Patent
Gourdin et al.

(10) Patent No.: US 10,030,119 B2
(45) Date of Patent: Jul. 24, 2018

(54) PHTALATE-FREE POLYVINYL CHLORIDE PLASTISOL COMPOSITIONS

(71) Applicant: Tarkett GDL, Lentzweiler (LU)

(72) Inventors: Diego Gourdin, Wiltz (LU);
Dominique Robert, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 8 days.

(21) Appl. No.: 15/109,264

(22) PCT Filed: Dec. 23, 2014

(86) PCT No.: PCT/EP2014/079226
§ 371 (c)(1),
(2) Date: Jun. 30, 2016

(87) PCT Pub. No.: WO2015/101569
PCT Pub. Date: Jul. 9, 2015

(65) Prior Publication Data
US 2016/0326346 A1    Nov. 10, 2016

Related U.S. Application Data

(60) Provisional application No. 61/923,342, filed on Jan. 3, 2014.

(30) Foreign Application Priority Data

Feb. 20, 2014 (EP) .................................... 14155971

(51) Int. Cl.
| | |
|---|---|
| C08K 5/12 | (2006.01) |
| C08K 5/11 | (2006.01) |
| C08K 5/101 | (2006.01) |
| C08J 9/10 | (2006.01) |
| C08J 3/18 | (2006.01) |
| B41F 23/08 | (2006.01) |
| C08K 3/26 | (2006.01) |

(52) U.S. Cl.
CPC ............... *C08K 5/12* (2013.01); *B41F 23/08* (2013.01); *C08J 3/18* (2013.01); *C08J 9/103* (2013.01); *C08K 3/26* (2013.01); *C08K 5/101* (2013.01); *C08K 5/11* (2013.01); *C08J 2327/06* (2013.01); *C08K 2003/265* (2013.01)

(58) Field of Classification Search
CPC ... C08K 5/11; C08K 5/12; C08K 3/26; C08K 5/101; C08K 2003/265; C08J 3/18; C08J 9/103; C08J 2327/06
See application file for complete search history.

(56) References Cited

U.S. PATENT DOCUMENTS

| | | | |
|---|---|---|---|
| 7,071,252 | B2 | 7/2006 | Stanhope et al. |
| 7,973,194 | B1 | 7/2011 | Kinkade et al. |
| 2007/0027242 | A1 | 2/2007 | Storzum et al. |
| 2008/0242895 | A1 | 10/2008 | Godwin et al. |
| 2009/0281220 | A1 | 11/2009 | Fenyvesi et al. |

FOREIGN PATENT DOCUMENTS

| | | | | |
|---|---|---|---|---|
| DE | 1962500 | A1 | 7/1970 | |
| EP | 1 354 867 | A2 | 10/2003 | |
| EP | 1 415 978 | A1 | 5/2004 | |
| EP | 1 983 024 | A1 | 10/2008 | |
| EP | 2 039 718 | A2 | 3/2009 | |
| EP | 2 045 286 | A1 | 4/2009 | |
| EP | 2 145 914 | A2 | 1/2010 | |
| EP | 2 404 962 | A1 | 1/2012 | |
| EP | 2 666 819 | A2 * | 11/2013 | .............. C08L 27/06 |
| EP | 2 231 763 | B1 | 1/2015 | |
| WO | WO 2008/110304 | A1 | 9/2008 | |
| WO | WO 2011/023590 | A1 | 3/2011 | |
| WO | WO 2013/004265 | A1 | 1/2013 | |
| WO | WO 2013/043711 | A1 | 3/2013 | |
| WO | WO 2013/048775 | A1 | 4/2013 | |

* cited by examiner

*Primary Examiner* — Robert Harlan
(74) *Attorney, Agent, or Firm* — Reinhart Boerner Van Deuren P.C.

(57) ABSTRACT

The present invention is related to improved phthalate-free polyvinyl chloride plastisol compositions for the production of decorative surface coverings, in particular floor and wall coverings with low emission of volatile organic compounds, to a method for the preparation of said phthalate-free PVC plastisols and to a process for the production of said surface coverings.

41 Claims, 1 Drawing Sheet

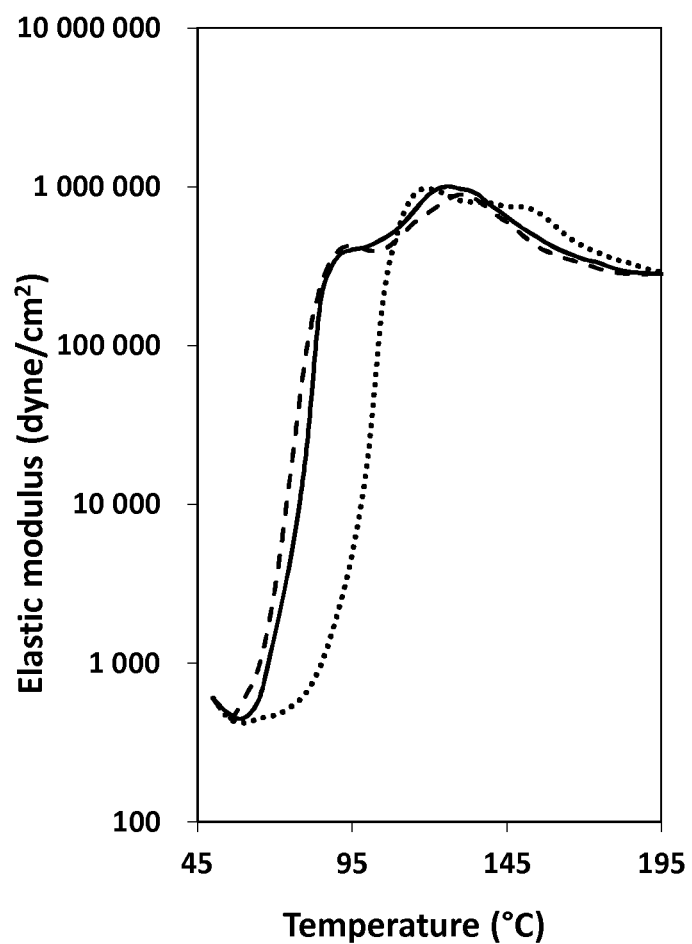

PHTALATE-FREE POLYVINYL CHLORIDE PLASTISOL COMPOSITIONS

FIELD OF THE INVENTION

The present invention is related to improved phthalate-free polyvinyl chloride plastisol compositions for the production of decorative surface coverings, in particular floor and wall coverings with low emission of volatile organic compounds. The invention is further related to a method for the preparation of said phthalate-free PVC plastisols and to a process for the production of said surface coverings.

STATE OF THE ART

Plasticizers have been used for decades for the processing of polyvinyl chloride. Plasticizers are additives which are used in polymer processing and which improve processability, flexibility and extensibility. The plasticizers for producing flexible polyvinyl chloride are mainly phthalic esters, such as the all-purpose products di-2-ethylhexyl phthalate (DEHP), diisononyl phthalate (DINP) and diisodecyl phthalate (DIDP).

Recently, the requirements placed upon the plasticizers have become more stringent with respect to performance and non-toxicity to humans and the environment. The use of phthalates is subject to continuously increasing restriction deriving from legal requirements. There thus is a need for a phthalate-free replacement of the phthalate ester plasticizers. Replacing phthalate based plasticizers by phthalate-free plasticizers is forced and is already subject to a number of technical publications and patent literature.

European patent application EP1983024 A1 proposes a plasticizer blend with low solution temperature and low volatility for processing plastics such as polyvinyl chloride. The plasticizer blend consists of an ester mixture comprising benzyl alkyl esters of aromatic tri- and tetra-carboxylic acids.

European patent application EP2039718A1 describes plasticizer mixtures based on aryl alkylsulphonate and on diol dibenzoates. The particular property of these plasticizer mixtures is low volatility.

European patent application EP2404962A1 provides a phthalate-free plasticizer mixture for the processing of plastics, such as polyvinyl chloride comprising 5 to 95% by weight of an aryl alkylsulphonate and from 95 to 5% by weight of a benzoic ester with a C9 or a C10 monohydric alcohol. The plasticizer blend provides shorter gelation times than the individual components, used alone.

European patent application EP2145914A1 discloses a plasticizer blend for polyvinyl chloride comprising 5 to 50% by weight of triacetin and from 50 to 95% by weight of one or more plasticizers having a solution temperature in polyvinyl chloride of less than 180° C., which is a phthalate-free plasticizer selected from the group consisting of alkyl esters of benzoic acid, dialkyl esters of aliphatic dicarboxylic acids, polyesters of aliphatic dicarboxylic acids and of aliphatic di-, tri- and tetrols, trialkyl esters of citric acid, acetylated trialkyl esters of citric acid, glycerol esters, benzoic diesters of mono-, di-, tri- or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl alkyl esters of phosphoric acid, trialkyl esters of phosphoric acid and/or aryl esters of alkanesulphonic acids.

European patent applications EP1415978A1 and EP1354867 A1 disclose the use of plasticizer mixtures of respectively isomeric decyl benzoates and of isomeric nonyl benzoates with dialkyl phthalate, dialkyl adipate or cyclohexanedicarboxylic ester.

US patent application 2007/0027242 discloses a plasticizer mixture for polyvinyl chloride comprising at least one ester of an aliphatic or aromatic di- or tricarboxylic acid having a C10 alcohol component and comprising at least one ester of an aliphatic or aromatic di- or tricarboxylic acid having a C7 alcohol component, where the aliphatic or aromatic di- or tricarboxylic acid has been selected from the group consisting of citric acid, phthalic acid, isophthalic acid, terephthalic acid, and trimellitic acid.

European patent application EP2231763A1 discloses a composition comprising a plasticizable polymer, such as polyvinyl chloride, at least one slow fusion plasticizer selected from esters of cyclohexanecarboxylic acid and at least one fast fusing plasticizer selected from the group consisting of isodecyl benzoate, isononyl benzoate 2-ethylhexyl benzoate, isooctyl benzoate, di-2-propylheptyl benzoate, dibutyl terephthalate, dibenzoate esters of dipropylene glycol, dibenzoate esters of diethylene glycol, C4-C7 aliphatic alcohol esters of cyclohexanoates, acetyl tributylcitrate, acetyl trihexyl citrate, butyryl tributyl citrate and mixtures thereof. discloses a plasticizer blend for polyvinyl chloride, comprising cyclohexanecarboxylic ester and other non-phthalate plasticizers.

German patent DE 1962500 discloses a plasticizer blend based on alkyl benzoate and succinic diesters. The final flexible-polyvinyl chloride product comprising the plasticizer blend exhibit excellent values for resistance to staining.

U.S. Pat. No. 7,973,194 discloses a high solvating plasticizer blend for polyvinyl chloride plastisols comprising a mixture of dibutyl esters, dibenzyl esters and butyl benzyl esters of 1,4-cyclohexane dicarboxylic acid.

US Patent application 2009/0281220 relates to plasticizers comprising monocarboxylic acid esters (monoesters and/or diesters) of poly(trimethylene ether) glycol and their use in plasticizing a variety of base polymers, such as polyvinyl chloride. The poly(trimethylene ether) glycol esters can be blended with other known ester plasticizers such as, for example, synthetic and natural esters.

US patent application 2008/0242895 relates to polyketone compounds and the at least partially hydrogenated products thereof as plasticizers for polymers such as polyvinyl chloride. The polymer further comprises at least one plasticizer compound selected from phthalic acid esters, adipic acid esters, trimellitic acid esters, cyclohexanoates, cyclohexane dicarboxylic esters, and benzoates.

International patent application WO 2013/048775 discloses a process for producing a polyvinyl chloride dry blend composition, the process comprising mixing polyvinyl chloride, a phthalate-free bio-based plasticizer and a filler. The bio-based plasticizer comprises a blend of an epoxidized triglyceride liquid and epoxidized fatty acid C1-C14 ester.

U.S. Pat. No. 7,071,252 discloses a non-aqueous plastisol composition comprising at least one organic polymer, at least one primary plasticizer and at least one secondary plasticizer selected from the group consisting of monoesters derived from a dihydric alcohol and an aromatic monocarboxylic acid; wherein said primary plasticizer is selected from the group consisting of diethylene glycol dibenzoate, triethylene glycol dibenzoate and dipropylene glycol dibenzoate and at least a portion of said secondary plasticizer is the corresponding monoester and the total of all monoesters constitutes from 5 to 20 of the total weight of said primary and secondary plasticizers. The concentration of said secondary plasticizer is sufficient to reduce the viscosity exhibited by said plastisol in the presence of said primary plasticizer alone while remaining compatible with said plastisol.

European patent EP2045286 B1 discloses improved polyvinyl chloride compositions comprising a blend of an ester of a cyclohexane polycarboxylic acid and one or more other plasticizers, in which the other plasticizer is a fast fusing plasticizer, selected from diethylene glycol dibenzoate, butyl benzyl phthalate, dipropylene glycol dibenzoate, aromatic sulfonic acid esters such as the phenyl or the cresyl ester of pentadecyl sulfonic acid, citrates, tri-2 ethyl hexyl phosphate, trioctyl phosphate, triphenyl phosphate, 2 ethyl hexyl isodecyl phosphate and 2-di-ethylhexyl phenyl phosphate.

International patent application WO 2013/004265 discloses a polyvinyl chloride composition comprising at least one non phthalate based plasticizer and at least one citrate based plasticizer, said citrate based plasticizer being selected from the group consisting of triethyl citrate, acetyl triethyl citrate, tributyl citrate, acetyl tributyl citrate and acetyl tri 2-ethylhexyl citrate.

Up to now the phthalate-free polyvinyl chloride compositions described in the prior art do not satisfactorily meet the requirements for rapid processing and/or reduced energy consumption in processing especially adapted for the production of decorative surface coverings, and in particular floor or wall coverings. Also the products obtained from processing these phthalate-free plastisols do not present a sufficiently reduced volatile organic compound (VOC) release.

Without contesting the associated advantages of the state of the art systems, it is nevertheless obvious that there is still a need for improved phthalate-free PVC plastisols, in particular phthalate-free PVC plastisols that do not show any of the existing shortcomings.

AIMS OF THE INVENTION

The present invention aims to provide phthalate-free plasticizer blends for PVC plastisols that do not present the drawbacks of the state of the art systems, in other words to provide phthalate-free plasticizer blends for polyvinyl chloride plastisols with good gelation properties, where these formulations permit rapid processing and/or reduced energy consumption in processing.

A further aim of the present invention is to provide phthalate-free plastisol formulations for decorative surface coverings exhibiting a low volatile organic compound (VOC) release and a process for the production of such surface coverings

SUMMARY OF THE INVENTION

As it is the customary practice in the area of technology, the proportions of the different ingredients of compositions are indicated in parts per weight, hereinafter referred to simply as "parts" for brevity. The present invention discloses a phthalate-free PVC-based plastisol composition for decorative surface coverings exhibiting low (reduced) VOC emission, said composition comprising from 10 to 200 parts, preferably from 20 to 150 parts per 100 parts of polyvinyl chloride of a plasticizer blend comprising:

from 5 to 190 parts, preferably from 10 to 160 parts, more preferably from 15 to 130 parts, most preferably from 15 to 75 parts of one or more phthalate-free primary plasticizers characterized by a solution temperature at the clear point, comprised between 130 and 200° C., preferably 130 and 160° C., and a vapor pressure at 25° C. of less than $5 \cdot 10^{-3}$ mm Hg;

from 1 to 100 parts, preferably from 3 to 80 parts, more preferably from 5 to 60 parts, most preferably from 5 to 50 parts of one or more phthalate-free secondary plasticizers characterized by a solution temperature at the clear point, of less than 130° C., preferably comprised between 70 and 129° C., and a vapor pressure at 25° C. of less than $10^{-1}$ mm Hg;

the solution temperatures of the one or more primary and the secondary plasticizers being measured according to DIN 53408 on suspension PVC with a K-value of 71;

the vapor pressure of the one or more primary and the secondary plasticizers being measured according to ASTM E1194-07, the vapor pressure of the one or more primary and the secondary plasticizers being measured according to ASTM E1194-07 wherein the ratio of the (weight) content of said one or more phthalate-free primary plasticizers to the (weight) content of said one or more phthalate-free secondary plasticizers is comprised between 0.1 and 10, preferably between 0.5 and 7.5, in order to reduce the gelation temperature exhibited by said plastisol in the presence of said one or more primary plasticizers alone by at least 5° C.

Preferred embodiments of the present invention disclose one or more of the following features:

said one or more phthalate-free primary plasticizers are characterized by a molecular weight comprised between 200 and 1000 g·mol$^{-1}$, preferably between 350 and 800 g·mol$^{-1}$;

said one or more phthalate-free secondary plasticizers are characterized by a molecular weight comprised between 150 and 600 g·mol$^{-1}$, preferably between 200 and 450 g·mol$^{-1}$;

said one or more phthalate-free primary plasticizers are characterized by a dynamic viscosity at 20° C. comprised between 5 and 200 mPa·s, preferably between 10 and 150 mPa·s;

said one or more phthalate-free secondary plasticizers are characterized by a dynamic viscosity at 20° C. comprised between 1 and 150 mPa·s, preferably between 5 and 120 mPa·s;

said one or more phthalate-free primary plasticizers are characterized by a vapor pressure at 25° C. of less than $10^{-5}$ mm Hg, preferably of less than $5 \cdot 10^{-6}$ mm Hg;

said one or more phthalate-free secondary plasticizers are characterized by a vapor pressure at 25° C. of less than $10^{-2}$ mm Hg, preferably less than $10^{-3}$ mm Hg, more preferably less than $10^{-4}$ mm Hg;

said one or more phthalate-free primary plasticizers are selected from the group consisting of the alkyl esters of cyclohexane dicarboxylic acids, the dialkyl esters of aliphatic dicarboxylic acids and the alkyl esters of aromatic di-, tri-, or tetra-carboxylic acids, with the exception of orthophthalic acid;

said one or more phthalate-free secondary plasticizers are selected from the group consisting of the lower alkyl esters of aromatic diacids, benzoates, citrates, phosphates, and sulfonates;

the phthalate-free PVC plastisol composition comprises 100 parts of polyvinyl chloride, 5 to 190 parts of one or more phthalate-free primary plasticizers, 1 to 100 parts of one or more phthalate-free secondary plasticizers, up to 250 parts of a filler, up to 7 parts of stabilizer, up to 5 parts of epoxidized vegetable oil and up to 100 parts of other components selected from the group consisting of viscosity reducers, blowing agents, liquid kickers, antistatic agents, fire retardants, dyes, pigments, lubricants and processing aids;

The present invention further discloses a method for the preparation of a phthalate-free PVC plastisols comprising the steps of:
a) blending 100 parts of polyvinyl chloride, 5 to 190 parts of one or more phthalate-free plasticizers to form a plastisol;
b) determining the difference between gelation/fusion profile of the phthalate-free plastisol of step a) and of a phthalate based plastisol, taken as reference, using a rheometer in the dynamic oscillatory mode with a controlled heating rate;
c) adjusting the gelation/fusion profile of the phthalate free plastisol of step a) to the gelation/fusion profile of the phthalate based plastisol, taken as reference by gradually adding from 1 to 100 parts of one or more phthalate-free secondary plasticizers to the plastisol of step a);

In a preferred embodiment of the method for the preparation of plastisol according to the invention:
the plastisol of step a) further comprises up to 250 parts of a filler, up to 7 parts of stabilizer, up to 5 parts of epoxidized vegetable oil and up to 100 parts of other components selected from the group consisting of viscosity reducers, blowing agents, liquid kickers, antistatic agents, fire retardants, dyes, pigments, lubricants and processing aids;

The present invention further discloses a method for the preparation of a decorative surface covering using the phthalate-free PVC plastisol according to the invention comprising the steps of:
a. supplying a backing layer;
b. contacting the backing layer with the composition according to any of the claims 1 to 7;
c. gelling said composition at a temperature comprised between 130° C. and 200° C.;

In a preferred embodiment, the method for the preparation of a decorative surface covering comprises the additional steps of:
d. printing a design on the gelled layer of step c)
e. contacting the printed gelled PVC layer of step d) with a protective wear layer;

Preferred embodiments of the method for the preparation of a decorative surface covering discloses one or more of the following features
the protective wear layer is a polyvinyl chloride layer, a polyurethane layer or a polyvinyl chloride layer with a polyurethane layer atop;
the decorative surface covering, in particular floor or wall covering obtained from processing the phthalate-free PVC plastisol composition has a total volatile organic compound (TVOC) emission lower than 100 µg·m$^{-3}$, preferably a volatile organic compound (VOC) emission, being the sum of the TVOC emission, the semi-volatile volatile organic compound (SVOC) emission and formaldehyde emission, lower than 10 µg·m$^{-3}$, measured after 28 days according to a test method based on ISO 16000-6, ISO 16000-9 or ISO 16000-10.

BRIEF DESCRIPTION OF THE DRAWING

FIG. 1 represents the viscoelastic profile of gelation and fusion of a plastisol made with respectively PVC/di-isononylphthalate (continuous line), PVC/phthalate-free primary plasticizer (dotted line) and PVC/phthalate-free primary+ secondary plasticizer (dashed line).

DETAILED DESCRIPTION OF THE INVENTION

The object of the present invention is to provide improved phthalate-free polyvinyl chloride plastisol compositions, intended for decorative surface coverings, in particular floor and wall coverings, with gelation/fusion properties comparable to or better than the gelation/fusion properties of the nowadays optimized phthalate based plastisols allowing the decorative surface coverings obtained from the processing of said plastisols to have a reduced VOC release, said VOC release being preferably below 100 µg·m$^{-3}$, more preferably below 10 µg·m$^{-3}$, measured under normalized conditions.

We have found that this object is achieved by PVC plastisols containing 10 to 200 parts of plasticizer blend per 100 parts of PVC, said blend comprising from 5 to 190 parts of one or more particular primary plasticizers and from 1 to 100 parts of one or more particular secondary plasticizers.

A plastisol is a fluid or a paste consisting of a mixture of polyvinyl chloride and a plasticizer optionally containing various additives. A plastisol is used to produce layers of polyvinyl chloride which are then fused to articles of flexible polyvinyl chloride. Plastisols typically contain 15 to 200 parts of plasticiser per 100 parts of polyvinyl chloride.

Plastisols are usually made from polyvinyl chloride that has been produced by emulsion polymerisation or micro-suspension polymerisation. The plastisol may be produced by the manufacturer of the polyvinyl chloride or a compounder and shipped to the user in fluid form. Alternatively the plastisol may be produced by the user.

For PVC prepared by suspension polymerisation, vinyl chloride monomer is suspended in water with agitation under carefully controlled temperature and pressure. The batch will also contain suspending agents and initiators. After complete polymerisation, the batch is discharged to a stripper where unreacted monomer is removed. Finally, the suspension is washed and dried to obtain the suspension polyvinyl chloride. Typical suspension polymerised polyvinyl chloride consists of agglomerated particles of a size in the range of 80 to 200 microns. Polyvinyl chloride of particle size between 1 and 40 microns may be produced by micro-suspension polymerisation.

For PVC prepared by emulsion polymerisation the vinyl chloride monomer is emulsified in water so that the polymerisation results in latex particles. The ratio of water to vinyl chloride monomer in emulsion polymerisation is greater than the ratio of water to vinyl chloride monomer in suspension polymerisation. Emulsion polymerised polyvinyl chloride also consists of agglomerated particles but the particles are generally smaller than the particles of suspension polymerised polyvinyl chloride. Typically, the agglomerated particles of emulsion polyvinyl chloride have a particle size in the range of 15 to 20 microns. Emulsion polymerised polyvinyl chloride is generally used in the production of plastisols which are used in coating operations where the plastisol is coated onto a substrate and is then fused by heating.

Different forms of polyvinyl chloride are used in different applications. One important property is the mean molecular weight of the polymer. A factor known as the "K value" is used to indicate the mean molecular weight of polyvinyl chloride. The K value is the viscosity of a 0.005% by weight solution of the polyvinyl chloride in cyclohexanone at 25° C.

as measured using an Ubbelhode viscometer. The K value is the German standard DIN 53726.

The K value of the polyvinyl chloride impacts the fusion temperature and gelation rate of the plasticised polyvinyl chloride composition. Typically the higher the K value the better the mechanical properties but the lower the flowability.

Emulsion and micro-suspension polymerised polyvinyl chloride are preferred for applications where good flow of the plasticised polyvinyl chloride is required such as spread coating, as used in the manufacture of floor or wall covering. For spread coating a K value 65 to 90 is preferred.

The one or more phthalate-free primary plasticizers are characterized by a solution temperature at clear point comprised between 130° C. and 200° C., preferably between 130° C. and 160° C.

The one or more phthalate-free secondary plasticizers are characterized by a solution temperature at clear point of less than 130° C., preferably between 70° C. and 129° C.

Solution temperature is the temperature at which a homogeneous phase is formed from a polyvinyl chloride dispersion in a plasticizer (L. Meier: "Weichmacher" [Plasticizers], in R. Gachter, H. Muiller (Ed.): Taschenbuch der Kunststoffadditive [Plastics additives handbook], 3rd Edition, pp. 361-362, Hanser Verlag, Munich 1990). Plasticizers with a low solution temperature permit fast processing that saves energy.

The solution temperatures of the one or more primary and the secondary plasticizers are measured according to DIN 53408 (1967) on suspension PVC with a K-value of 71.

The phthalate-free primary plasticizers further are characterized by a vapor pressure at 25° C. of less than $5 \cdot 10^{-3}$ mm Hg, preferably less than $10^{-5}$ mm Hg, more preferably of less than $5 \cdot 10^{-6}$ mm Hg, a dynamic viscosity at 20° C. comprised between 5 and 200 mPa·s, preferably between 10 and 150 mPa·s and a molecular weight comprised between 200 and 1000 g·mol$^{-1}$, preferably between 350 and 800 g·mol$^{-1}$.

The phthalate-free secondary plasticizers are further characterized by a vapour pressure at 25° C. of less than $10^{-1}$ mm Hg, preferably less than $10^{-2}$ mm Hg, more preferably of less than $10^{-3}$ mm Hg, most preferably $10^{-4}$ mm Hg, a dynamic viscosity at 20° C. comprised between 1 and 150 mPa·s, preferably between 5 and 120 mPa·s and a molecular weight comprised between 150 and 600 g·mol$^{-1}$, preferably between 200 and 450 g·mol$^{-1}$.

The vapour pressure, which is the pressure exerted by a vapour in thermodynamic equilibrium with its condensed phase at a given temperature in a closed system, is measured according to ASTM E1194-07 and relates to the tendency of particles to escape from that condensed phase. A low vapour pressure relates to low VOC release.

The dynamic viscosity is measured according to ASTM D2983 using a Brookfield rotary viscometer.

The primary plasticizers preferably are selected from the group consisting of the alkyl esters of cyclohexane dicarboxylic acids, the dialkyl esters of aliphatic dicarboxylic acids and the alkyl esters of aromatic di-, tri-, or tetracarboxylic acids, with the exception of orthophthalic acid.

Examples of alkyl esters of cyclohexane dicarboxylic acids are diisobutyl-, diisopentyl-, diisohexyl-, di-2-ethylhexyl-, dicyclohexyl-, di-n-heptyl-, diisoheptyl-, di-n-octyl-, diisooctyl-, di-n-nonyl-, diisononyl-, di (3,5,5-trimethyl hexyl)-, di (2,6-di methyl-4-heptyl)-, di-n-decyl-, diisodecyl-, di-2-propyl heptyl-, di-n-undecyl-diisoundecyl-, di-n-dodecyl-, di-n-tridecyl-, diisotridecyl-, di-n-tetradecyl-, di-n-hexadecyl-, di-n-octadecyl-, diisooctadecyl esters of 1,2-cyclohexane dicarboxylic acid, of 3-methyl-1,2-cyclohexane dicarboxylic acid, of 4-methyl-1,2-cyclohexane dicarboxylic acid, of 1,4-cyclohexane dicarboxylic acid, and of 3-methyl-1,4-cyclohexane dicarboxylic acid.

Examples of dialkyl esters of aliphatic dicarboxylic acids are diheptyl-, dioctyl-, dinonyl-, dodecyl-, diundecyl-, didodecyl-, ditridecyl-, ditetradecyl-, dihexadecyl-, dioctadecyl-, dicyclohexyl-, diisoheptyl-, di (3,5,5-trimethyl hexyl)-, di (2,6-di methyl-heptyl)-, diisooctyl-, diisononyl-, diisodecyl-, diisoundecyl-, diisododecyl-, diisotridecyl-, di-2-ethylhexyl-di-2-propyl heptyl-, diisooctadecyl esters of adipic and azelaic acid.

Examples of alkyl esters of aromatic di-, tri-, or tetracarboxylic acids, with the exception of orthophthalic acid are dicyclohexyl-, di-n-octyl-, diisooctyl-, di-2-ethylhexyl-, di-n-nonyl-, diisononyl-, di-n-decyl-, diisodecyl-, di-n-undecyl-, diisoundecyl-, di-n-docecyl-, diisododecyl-, di-n-octadecyl-, diisooctadecyl-, di-n-eicosyl esters of isophthalic and terephthalic acid, tricyclohexyl-, tri-2-ethylhexyl-, tri-n-octyl-, triisooctyl-, tri-n-nonyl-, triisononyl-, tri-n-decyl-, triisodecyl-, tri-n-undecyl-, triisoundecyl-, tri-n-dodecyl-, triisododecyl-, tri-n-octadecyl-, triisooctadecyl-, tri-n-eicosyl esters of trimellitic acid or its anhydride, tetracyclohexyl-, tetra-2-ethylhexyl-, tetra-n-octyl-, tetraisooctyl-, tetra-n-nonyl-, tetraisononyl-, tetra-n-decyl-, tetraisodecyl-, terta-n-undecyl-, tetraisoundecyl-, tetra-n-dodecyl-, tetraisododecyl-, tetra-n-octadecyl-, tetraisooctadecyl-, tetra-n-eicosyl esters of pyromellitic acid or its anhydride.

Diisononyl cyclohexanoate, diisooctyladipate, dioctyladipate, dioctyl terephthalate and mixtures thereof are the preferred primary plasticizers of the present invention.

The secondary plasticizers are preferably selected from the group consisting of the lower alkyl esters of aromatic diacids, benzoates, citrates, phosphates, and sulfonates.

Examples of lower alkyl esters of aromatic diacids are dimethyl-, diethyl-, di-n-propyl-, di-n-butyl-, di-tert-butyl-, diisobutyl-, diglycol esters of isophthalic acid and terephthalic acid, Examples of benzoates are diethylene glycol dibenzoate, triethylene glycol dibenzoate, and tripropylene glycol dibenzoate, cyclohexyl-, n-heptyl-, isoheptyl-, n-octyl-, isooctyl-, 2-ethylhexyl-, n-nonyl-, isononyl-, 3,5,5-trimethyl hexyl-, 2,6-dimethyl-4-heptyl, n-decyl-, isodecyl-, 2-propylheptyl-, n-undecyl-, isoundecyl-, n-dodecyl-, isododecyl-, n-tridecyl-, isotridecyl-, n-tetradecyl-, n-hexadecyl-, n-octadecyl-, isooctadecyl-ester of benzoic acid.

Examples of citrates are triethyl citrate, acetyl triethyl citrate, tributyl citrate, acetyl tributyl citrate and acetyl tri 2-ethylhexyl citrate.

Examples of phosphates are tri-2 ethyl hexyl phosphate, trioctyl phosphate, triphenyl phosphate, 2 ethyl hexyl isodecyl phosphate and 2-di-ethylhexyl phenyl phosphate.

Examples of sulfonates are the phenyl or the cresyl ester of pentadecyl sulfonic acid.

Isononylbenzoate, dibutyl terephthalate, diethylene glycol dibenzoate, acetyl tributyl citrate and mixtures thereof are the preferred secondary plasticizers of the present invention.

The phthalate-free plastisol of the present invention preferably comprises from 10 to 160 parts, more preferably from 15 to 130 parts, most preferably from 15 to 75 parts of one or more phthalate-free primary plasticizers and from 3 to 80 parts, more preferably from 5 to 60 parts, most preferably 10 to 50 parts of one or more phthalate-free secondary plasticizers per 100 parts of polyvinyl chloride.

The phthalate-free plastisol of the present invention further comprises up to 250 parts of fillers, up to 7 parts of stabilizers, up to 5 parts epoxidized vegetable oils and up to 100 parts of other components selected from the group consisting of viscosity reducers, blowing agents, liquid kickers, antistatic agents, fire retardants, dyes, pigments, lubricants and processing aids.

Illustrative examples of fillers are calcium carbonate, clays, calcium silicate, talc, calcium sulfate, calcium oxide, magnesium oxide, titanium oxide, zinc oxide, aluminosilicates, dolomite, bauxite and silica, diatomaceous earth and molecular sieves.

Examples of stabilizers are benzotriazole and benzophenone compounds to reduce the degradation by sunlight and stabilizers to provide stability during heat processing which are typically metal compounds, particularly lead salts, organotin compounds, barium, cadmium and zinc salts and calcium/zinc stabilisers.

Examples of epoxidized vegetable oils are epoxidized soya bean oil, sunflower oil, linseed oil, corn oil rubber seed oil, neem oil and mee oil. The epoxidized vegetable oils may be mixed into the plastisol composition as plasticizer providing heat and light stability.

Examples of viscosity reducing agents are aliphatic hydrocarbons such as Viscobyk® 4010, 4013, 4015 and 4040, carboxylic acid derivates such as Viscobyk® 5025, 5125 and 5050, Jayflex® 615 or Exxsol® D100, dodecyl benzene such as Jayflex® 602, specialty esters based on oleates and laurates, 2,2,4-trimethylpentanediol diisobutyrate, C3 to C17 esters of 1,2,4-trimethyl-1,3-pentanediol, C3 to C17 esters of 1,2,4-trimethyl-1,3-pentanediol monoisobutyrate and mixtures thereof, such as disclosed in U.S. Pat. No. 7,741,395.

Examples of blowing agents include azodicarbonamide, oxybisbenzenesulfonylhydrazide, azobisisobutyronitrile, toluenesulfonylhydrazide, sodium bicarbonate and citric acid which release for example nitrogen and carbon dioxide and water when heated.

Examples of kickers include lead compounds such as dibasic lead phthalate, zinc oxide or barium/cadmium compounds. Kickers control and lower the decomposition temperature of the blowing agent.

Examples of antistatic agents are cationic, non-ionic or anionic in nature and generally are selected from the group consisting of amides and amines, quaternary ammonium compounds, polyalkylene glycol derivatives, sulphates and sulphonates, and miscellaneous ethers and esters.

Typical examples of antistatic agents are lauramidopropyl-trimethylammonium methosulfate, myristamidopropyl-trimethylammonium methosulfate, stearamidopropyl-trimethylammonium methosulfate and stearamidopropyl-dimethyl-beta-hydroxyethylammonium dihydrogen phosphate. The antistatic agents reduce build-up of static charges and to promote charge dissipation in their products.

Examples of fire retardants that can be used in the phthalate-free plastisol compositions of the present invention include halogen containing compounds and phosphorous containing organic compounds such as triaryl, trialkyl or alkyl diaryl phosphate esters. Other materials that may be used include chloroparaffins, aluminum trihydrate or antimony oxides.

The fire retardants are admixed to the compositions of the present invention in order to increase ignition time, reduce flame spreading and rate of burning.

A variety of dyes and pigments can be utilised in the phthalate-free plastisol compositions of the invention. Examples of useful pigments and dyes are: metallic oxides such as ironoxide, metal hydroxides, metal powders, sulphides, sulphates, carbonates, silicates such as ammoniumsilicate, carbon black, china clay, barytes, iron blues, lead blues, organic reds, organic maroons and the like.

Examples of lubricants and processing aids that can be used in the phthalate-free plastisol compositions of the present invention include stearic acid, metal stearates, petroleum waxes, silicon oil, mineral oil, synthetic oils and polyethylene waxes The phthalate-free plastisol compositions of the present invention are prepared using any convenient method known to the one skilled in the art. In general the finely divided PVC polymer and optionally other finely divided solid materials are dispersed in the liquid plasticizer blend forming a paste. On heating the dispersion to a temperature above 100° C., the polymer becomes soluble in the plasticizer whereupon the two phase dispersion is transformed into a single phase system. Typically PVC plastisols are produced in batch processes using high shear mixing equipment. The mixing generally is performed for a period of from about 15 to about 60 minutes, whereupon the blend is cooled down. In general such process is used for making plastisols which are immediately further processed, since the high friction level of the mixing elements in the plastisol results in high local temperature increase which generally results in poor viscosity stability of the plastisol on storage.

On the other hand, storage stable plastisols can be prepared by blending the finely divided PVC polymer, optionally other finely divided solid materials, liquid plasticizer blend and optionally other liquid materials in a blending tank with low shear. The pre-homogenized plastisol is recirculated from the blending tank through a dynamic mixer back into the blending tank. This recirculation is performed up to 10 times prior to discharging the final plastisol.

The present invention provides a method for the formulation of the optimized recipe of phthalate-free low VOC PVC plastisol.

Hereto a nowadays optimized phthalate containing PVC plastisol, in general a plastisol composition comprising diisononyl phthalate is used as reference. The optimized diisononyl phthalate comprising PVC plastisol results in decorative surface coverings with low VOC release, in general a VOC release equal to or lower than 100 $\mu g \cdot m^{-3}$ measured after 28 days according to a test method based on ISO 16000-6, ISO 16000-9 or ISO 16000-10.

The diisononyl phthalate comprising PVC plastisol is then subjected to a viscoelastic measurement. A Rheometrics Mechanical Spectrometer RMS-605 was used in the dynamic oscillatory mode with a controlled heating rate. The frequency of oscillation was maintained at 1 Hz; heating was started from room temperature to 200° C. with a programmed increase rate of 5° C. per minute. After allowing a few minutes for equilibrating to the desired temperature, the measurements were made (FIG. 1, continuous line).

The gelation/fusion profile of the di-isononyl phthalate comprising PVC plastisol preferably is obtained from the plastisol composition comprising filler, plasticizer, epoxidized vegetable oil and other auxiliary constituents.

Subsequently, diisononyl phthalate is substituted by a phthalate-free primary plasticizer, answering the physical characteristics as claimed in the present invention where solution temperature, at clear point, and vapor pressure at 25° C. are key guidelines in selecting the most appropriate primary plasticizer.

The substitution preferably is performed in a plastisol composition that comprises filler, stabilizer, epoxidized vegetable oil and other auxiliary constituents.

The composition of the phthalate-free PVC plastisol thus is identical to the diisononyl based PVC plastisol with the exception of the plasticizer.

Then the gelation/fusion profile is determined for the phthalate-free PVC plastisol, using identical measuring conditions as those used for the diisononyl phthalate comprising PVC plastisol, described in paragraph 77 (FIG. 1, dotted line).

In a subsequent step, a phthalate-free secondary plasticizer, answering the physical characteristics as claimed in the present invention is gradually added until the curve representing the elastic modulus as a function of the temperature (gelation/fusing profile) coincides with the gelation/fusion profile of the diisononyl phthalate based PVC plasticizer (FIG. 1, dashed line).

The type and quantity of the one or more secondary plasticizer is selected in such a way that said one or more secondary plasticizer remains compatible with the plastisol; thus for a ratio of primary to secondary plasticizer comprised between 0.1 and 10, preferably between 0.5 and 7.5, the plastisol has to remain homogeneous and once converted into a PVC layer, the secondary plasticizer may not exude to the surface of said layer.

The phthalate-free PVC plastisols are intended for decorative surface covering more particularly floor and wall covering.

Accordingly the present invention provides a decorative surface covering comprising one or more layers comprising phthalate free PVC plastisol.

In a further preferred embodiment, the present invention provides a multilayer decorative surface covering of one or more adjacent phthalate-free plasticised polyvinyl chloride layers obtained from the phthalate-free PVC plastisol according to the present invention. Typically these layers include a foam layer, a decorative layer and a clear protective wear layer.

In yet a further embodiment the present invention provides a method for the preparation of a decorative surface covering comprising spreading out at least one phthalate-free PVC plastisol layer according to the present invention on a backing layer and gelling said at least one phthalate-free PVC plastisol layer at a temperature comprised between 130° C. and 200° C. Hereto, the at least one phthalate-free PVC plastisol of the present invention is spread on a backing layer moving at around 15 to 25 meters per minute.

For multilayer decorative surface coverings the phthalate-free PVC plastisol is spread on the backing layer in several layers so that the floor covering is literally built up.

The multilayer product is first gelled by contact with one or more heated roll and then passed into an oven where they are gelled and fused at a temperature of from 130° C. to 200° C.

Often the gelling is performed after the spreading of each individual layer starting with the base layer. After the gelling the next layer can be spread.

After gelation of the decorative layer a design may be printed before the application of the protective wear layer.

The protective wear layer in general comprises a PVC layer obtained from gelation/fusion of a PVC plastisol.

When all layers have been spread, and gelled at a temperature comprised between 130° C. and 200° C., the product is passed into an oven to obtain full fusion of all layers together and adequate expansion of the foamed layers.

After gelling and fusing the at least one phthalate-free PVC plastisol compositions of the present invention, the decorative surface covering is cooled down and is optionally provided with a coating, preferably a polyurethane coating in order to improve wear and stain resistance. Preferably the polyurethane coating is water based; more preferably the coating is obtained from the actinic irradiation of radiation curable polyurethane dispersions. In general the thickness of the polyurethane coating is comprised between 5 and 50 microns, preferable between 15 and 40 microns.

The decorative surface coverings of the present invention, without the coating, preferably the polyurethane coating, are subjected to VOC release measurement according to ISO 16000, ISO 16000-6, ISO 16000-9 or ISO 16000-10. Total volatile organic compounds (TVOC) and semi-volatile organic compounds (SVOC) are measured after 28 days.

EXAMPLES

The following illustrative examples are merely meant to exemplify the present invention but are not destined to limit or otherwise define the scope of the present invention.

Table 1 represents an optimized phthalate based (column 3) and phthalate-free (column 4) polyvinyl chloride plastisol formulation which after gelling is converted in a typical polyvinyl chloride layer.

Table 2 represents an optimized phthalate based (column 3) and phthalate-free (column 4) polyvinyl chloride plastisol formulation which after gelling is converted in a typical polyvinyl chloride foam layer.

Table 3 represents an optimized phthalate based (column 3) and phthalate-free (column 4) polyvinyl chloride plastisol formulation which after gelling is converted in a typical polyvinyl chloride wear layer. Optimization of the phthalate plastisol formulation was performed on the basis of criteria such as gelation/fusion profile of the plastisol and hardness, flexibility, stiffness, heat stability, UV stability and VOC emission of the derived layer.

The phthalate-free PVC plastisol formulations are derived from the corresponding phthalate based formulations by applying the procedure as described in paragraphs 75 to 83.

TABLE 1

|  | Component | Phthalate based | Phthalate-free |
|---|---|---|---|
| PVC | Paste PVC micro-suspension | 100.00 | 100.00 |
| Primary plasticizer | Diisononyl phthalate | 75.00 |  |
|  | Diisononyl cyclohexanoate |  | 65.00 |
| Secondarry plasticizer | Acetyl tributyl citrate |  | 20.00 |
| Diluant | Fatty acid methyl ester | 11.40 |  |
| Filler | Calcium carbonate | 152.00 | 152.00 |
| Other component | Rheology additive | 2.90 | 2.90 |

In table 1, the PVC resin micro-suspension is Vestolit® P1415 K80 from Vestolit; diisononyl phthalate is Vestinol® 9 from Evonik; diisononyl cyclohexane is Hexamoll® DINCH from BASF; acetyl tributyl citrate is Citrofol® B II from Jungbunzlauer; the fatty acid methyl ester is Viscobyk®-LP-R-21151 from Byk Chemie; calcium carbonate is Mikhart® 10 from Provencale and the rheology additive is composed of 0.40 parts of Aerosil® 200 from Evonik and 2.50 parts of Byk® 8070 fom Byk Chemie.

The polyvinyl chloride layers obtained after gelling/fusing at a temperature of 170° C. for a period of 30 seconds, at a thickness of about 200 micrometer are characterized by:
  phthalate based formulation: TVOC emission after 28 days of less than 100 µg·m$^{-3}$ phthathalate-free formulation: TVOC, SVOC and formaldehyde emission after 28 days equal to or less than 10 $\mu g \cdot m^{-3}$.

TABLE 2

| Component | | Phthalate based | Phthalate-free |
|---|---|---|---|
| PVC | Paste PVC micro-suspension | 100.00 | 100.00 |
| Primary plasticizer | Diisononyl phthalate | 53.00 | |
| | Diisononyl cyclohexanoate | | 55.00 |
| Secondary plasticizer | Isononyl benzoate | 11.00 | 10.00 |
| | Diethylene glycol dibenzoate | | 7.00 |
| Diluant | Fatty acid methyl ester | 9.00 | |
| Filler | Calcium carbonate | 160.00 | 160.00 |
| Other component | Blowing agent | 2.90 | 2.90 |
| | Kicker | 1.70 | 1.70 |

In table 2, the PVC resin micro-suspension is a blend of 59 parts of Vestolit® P1357 K from Vestolit and 41 parts of Lacovyl® PB 1156 from Arkema, diisononyl phthalate is Vestinol® 9 from Evonik, diisononyl cyclohexane is Hexamoll® DINCH from BASF, isononyl benzoate is Vestinol® INB from Evonik, diethyleneglycol dibenzoate is Benzoflex® 9-88 from Eastman, the fatty acid methyl ester is Viscobyk®-LP-R-21151 from Byk Chemie, calcium carbonate is Mikhart® 40 from Provencale, the blowing agent, azodicarbonamide, is Unifoam® Ultra 1035 from Hebron and the kicker, zinc oxide, is Harzsiegel® 1001 from Norzinco.

The polyvinyl chloride layers obtained after gelling/fusing at a temperature of 180° C. for a period of 60 seconds, at a thickness of about 2000 micrometer are characterized by:
   phthalate based formulation: TVOC emission after 28 days equal to or less than 100 $\mu g \cdot m^{-3}$
   phthalate-free formulation: TVOC emission after 28 days equal to or less than 100 $\mu g \cdot m^{-3}$ and SVOC emission after 28 days equal to or less than 0.1 $mg \cdot m^{-3}$, which is in compliance with the AgBB regulation.

TABLE 3

| Component | | Phthalate based | Phthalate-free |
|---|---|---|---|
| PVC | Paste PVC micro-suspension | 70.00 | 70.00 |
| | Paste PVC resin extender | 30.00 | 30.00 |
| Primary plasticizer | Diisononyl phthalate | 16.50 | |
| | Diisononyl cyclohexanoate | | 18.00 |
| Secondarry plasticizer | Isononyl benzoate | 7.00 | 10.00 |
| Diluant | Fatty acid methyl ester | 4.70 | |
| Stabilizer | Liquid Ca/Zn | 2.00 | 2.00 |
| | Epoxidized soya bean oil | 2.50 | 2.50 |
| Other component | Air release additive | 0.60 | 0.60 |

In table 3, the PVC resin micro-suspension is a blend of 60.00 parts of Lacovyl® PB 1704 H, 10 parts of Lacovyl® PB 1202 from Arkema and 30.00 parts of Vinnolit® EXT from Vinnolit, diisononyl phthalate is Vestinol® 9 from Evonik, diisononyl cyclohexane is Hexamoll® DINCH from BASF, isononyl benzoate is Vestinol® INB from Evonik, the fatty acid methyl ester is Viscobyk®-LP R 21151 from Byk Chemie, liquid Ca/Zn stabilizer is Lankromark® LZC 393 from Akcros, epoxidized soya bean oil is Drapex® HSE from Galata Chemicals and air release additive Byk® 3160 from Byk Chemie.

The polyvinyl chloride layers obtained after gelling/fusing at a temperature of 170° C. for a period of 40 seconds, at a thickness of about 300 micrometer are characterized by:
   phthalate based formulation: TVOC emission after 28 days equal to or less than 100 $\mu g \cdot m^{-3}$
   phthalate-free formulation: TVOC emission after 28 days equal to or less than 100 $\mu g \cdot m^{-3}$.

The examples clearly prove that nowadays optimized phthalate based PVC plastisols can be substituted by phthalate-free plastisols which can be converted in a PVC layer using identical processing conditions, said PVC layer being characterized by VOC emissions comparable to the corresponding phthalate comprising PVC layers.

The right selection and appropriate combination of phthalate-free primary and secondary plasticizers is the key guideline for the gelation/fusion profile of the phthalate-free plastisol to coincide with the gelation/fusion profile of the phthalate based reference.

As has been surprisingly found in the present invention, the right selection of suitable primary and secondary plasticizers in order to formulate a plastisol having a gelation/fusion profile identical to the gelation/fusion profile of the phthalate based reference and in order to produce polyvinyl chloride layers showing comparable VOC emission is dictated by a number of particular physico-chemical characteristics.

As appears from Table 4, the physico-chemical characteristics of interest are the solution temperature at clear point, the vapor pressure at 25° C. in the first instance and the viscosity at 20° C. and the molecular weight in the second instance.

TABLE 4

| | Solution temperature | Vapor pressure @ 25° C. | Viscosity @ 20° C. | Molecular weight |
|---|---|---|---|---|
| Diisononyl cyclohexane | 151 | $9.75 \cdot 10^{-7}$ | 52.0 | 425 |
| Acetyl tributyl citrate | 105 | $4.60 \cdot 10^{-6}$ | 33.0 | 402 |
| Isononyl benzoate | 128 | $1.8 \cdot 10^{-4}$ | 8.4 | 248 |
| Diethyleneglycol dibenzoate | 75 | $1.0 \cdot 10^{-5}$ | 105 | 342 |

The phthalate-free plastisols of the present invention allow for decorative surface coverings, in particular floor and wall coverings, with properties such as hardness, flexibility, stiffness, heat stability, UV stability and VOC emission similar to those as obtained from gelling and fusing the phthalate equivalents.

The invention claimed is:

1. A phthalate-free PVC-based plastisol composition for decorative surface coverings exhibiting low VOC (volatile organic compound) emission, said composition comprising from 10 to 200 parts per 100 parts of polyvinyl chloride of a plasticizer blend comprising the following parts per weight ingredients:
   from 5 to 190 parts of one or more phthalate-free primary plasticizers characterized by a solution temperature at the clear point, comprised between 130 and 200° C. and a vapor pressure at 25° C. of less than $5 \cdot 10^{-3}$ mm Hg;
   from 1 to 100 parts of one or more phthalate-free secondary plasticizers characterized by a solution temperature at the clear point, of less than 130° C. and a vapor pressure at 25° C. of less than $10^{-1}$ mm Hg;
   the solution temperatures of the one or more primary and the secondary plasticizers being measured according to DIN 53408 on suspension PVC with a K-value of 71; the vapor pressure of the one or more primary and the secondary plasticizers being measured according to ASTM E1194-07, wherein the ratio of the content of said one or more phthalate-free primary plasticizers to the content of said one or more phthalate-free secondary plasticizers is comprised between 0.1 and 10 in order to reduce the gelation temperature exhibited by said plastisol in the presence of said one or more primary plasticizers alone by at least 5° C.

2. The composition according to claim 1 wherein said one or more phthalate-free primary plasticizers are characterized by a molecular weight comprised between 200 and 1000 g·mol$^{-1}$ and wherein said one or more phthalate-free secondary plasticizers are characterized by a molecular weight comprised between 150 and 600 g·mol$^{-1}$.

3. The composition according to claim 1 wherein said one or more phthalate-free primary plasticizers are characterized by a dynamic viscosity at 20° C. comprised between 5 and 200 mPa·s and wherein said one or more phthalate-free secondary plasticizers are characterized by a dynamic viscosity at 20° C. comprised between 1 and 150 mPa·s.

4. The composition according to claim 1 wherein the one or more phthalate-free primary plasticizers are characterized by a vapor pressure at 25° C. of less than $10^{-5}$ mm Hg and wherein said one or more phthalate-free secondary plasticizers are characterized by a vapor pressure at 25° C. of less than $10^{-2}$ mm Hg.

5. The composition according to claim 1 wherein said one or more phthalate-free primary plasticizers are selected from the group consisting of the alkyl esters of cyclohexane dicarboxylic acids, the dialkyl esters of aliphatic dicarboxylic acids and the alkyl esters of aromatic di-, tri-, or tetra-carboxylic acids, with the exception of orthophthalic acid.

6. The composition according to claim 1 wherein said one or more phthalate-free secondary plasticizers are selected from the group consisting of the lower alkyl esters of aromatic diacids, benzoates, citrates, phosphates, and sulfonates.

7. The composition according claim 1 comprising 100 parts of polyvinyl chloride, 5 to 190 parts of one or more phthalate-free primary plasticizers, 1 to 100 parts of one or more phthalate-free secondary plasticizers, up to 250 parts of a filler, up to 7 parts of stabilizer, up to 5 parts of epoxidized vegetable oil and up to 100 parts of other components selected from the group consisting of viscosity reducers, blowing agents, liquid kickers, antistatic agents, fire retardants, dyes, pigments, lubricants and processing aids.

8. Method for the preparation of phthalate-free PVC plastisols according to claim 1 comprising the steps of:
a) blending 100 parts of polyvinyl chloride, 5 to 190 parts of one or more phthalate-free plasticizers to form a plastisol;
b) determining the difference between gelation/fusion profile of the phthalate-free plastisol of step a) and of a phthalate based plastisol, taken as reference, using a rheometer in the dynamic oscillatory mode with a controlled heating rate;
c) adjusting the gelation/fusion profile of the phthalate free plastisol of step a) to the gelation/fusion profile of the phthalate based plastisol, taken as reference by gradually adding from 1 to 100 parts of one or more phthalate-free secondary plasticizers to the plastisol of step a).

9. Method according to claim 8 wherein the plastisol of step a) further comprises up to 250 parts of a filler, up to 7 parts of stabilizer, up to 5 parts of epoxidized vegetable oil and up to 100 parts of other components selected from the group consisting of viscosity reducers, blowing agents, liquid kickers, antistatic agents, fire retardants, dyes, pigments, lubricants and processing aids.

10. Method for the preparation of a decorative surface covering with the phthalate-free PVC plastisol composition according to claim 1 comprising the steps of:
a) supplying a backing layer;
b) contacting the backing layer with the composition according to claim 1;
c) gelling said composition at a temperature comprised between 130° C. and 200° C.

11. Method according to claim 10 comprising the additional steps of:
d) printing a design on the gelled layer of step c);
e) contacting the printed gelled PVC layer of step d) with a protective wear layer.

12. Method according to claim 11 wherein the protective wear layer is a polyvinyl chloride layer, a polyurethane layer or a polyvinyl chloride layer with a polyurethane layer atop.

13. Decorative surface covering, in particular floor or wall covering obtained from processing the phthalate-free PVC plastisol composition according to claim 1, said surface covering having a TVOC (total volatile organic compound) emission lower than 100 µg·m-3 measured after 28 days according to a test method based on ISO 16000-6, ISO 16000-9 or ISO 16000-10.

14. The composition according to claim 1, wherein said composition comprises from 20 to 150 parts per 100 parts of polyvinyl chloride of a plasticizer blend.

15. The composition according to claim 1, wherein the plasticizer blend comprises from 10 to 160 parts of one or more phthalate-free primary plasticizers characterized by a solution temperature at the clear point, comprised between 130 and 200° C.

16. The composition according to claim 1, wherein the plasticizer blend comprises from 10 to 160 parts of one or more phthalate-free primary plasticizers characterized by a solution temperature at the clear point, comprised between 130 and 160° C.

17. The composition according to claim 1, wherein the plasticizer blend comprises from 15 to 130 parts of one or more phthalate-free primary plasticizers characterized by a solution temperature at the clear point, comprised between 130 and 200° C.

18. The composition according to claim 1, wherein the plasticizer blend comprises from 15 to 130 parts of one or more phthalate-free primary plasticizers characterized by a solution temperature at the clear point, comprised between 130 and 160° C.

19. The composition according to claim 1, wherein the plasticizer blend comprises from 15 to 75 parts of one or more phthalate-free primary plasticizers characterized by a solution temperature at the clear point, comprised between 130 and 200° C.

20. The composition according to claim 1, wherein the plasticizer blend comprises from 15 to 75 parts of one or more phthalate-free primary plasticizers characterized by a solution temperature at the clear point, comprised between 130 and 160° C.

21. The composition according to claim 1, wherein the plasticizer blend comprises from 5 to 190 parts of one or more phthalate-free primary plasticizers characterized by a solution temperature at the clear point, comprised between 130 and 160° C.

22. The composition according to claim 1, wherein the plasticizer blend comprises from 1 to 100 parts of one or more phthalate-free secondary plasticizers characterized by a solution temperature at the clear point, comprised between 70 and 129° C.

23. The composition according to claim 1, wherein the plasticizer blend comprises from 3 to 80 parts of one or more phthalate-free secondary plasticizers characterized by a solution temperature at the clear point of less than 130° C.

24. The composition according to claim 1, wherein the plasticizer blend comprises from 3 to 80 parts of one or more phthalate-free secondary plasticizers characterized by a solution temperature at the clear point, comprised between 70 and 129° C.

25. The composition according to claim 1, wherein the plasticizer blend comprises from 5 to 60 parts of one or more phthalate-free secondary plasticizers characterized by a solution temperature at the clear point of less than 130° C.

26. The composition according to claim 1, wherein the plasticizer blend comprises from 5 to 60 parts of one or more phthalate-free secondary plasticizers characterized by a solution temperature at the clear point, comprised between 70 and 129° C.

27. The composition according to claim 1, wherein the plasticizer blend comprises from 5 to 50 parts of one or more phthalate-free secondary plasticizers characterized by a solution temperature at the clear point of less than 130° C.

28. The composition according to claim 1, wherein the plasticizer blend comprises from 5 to 50 parts of one or more phthalate-free secondary plasticizers characterized by a solution temperature at the clear point, comprised between 70 and 129° C.

29. The composition according to claim 1, wherein the ratio of the content of said one or more phthalate-free primary plasticizers to the content of said one or more phthalate-free secondary plasticizers is comprised between 0.5 and 7.5, in order to reduce the gelation temperature exhibited by said plastisol in the presence of said one or more primary plasticizers alone by at least 5° C.

30. The composition according to claim 1, wherein said one or more phthalate-free primary plasticizers are characterized by a molecular weight comprised between 200 and 1000 g·mol$^{-1}$ and wherein said one or more phthalate-free secondary plasticizers are characterized by a molecular weight comprised between 200 and 450 g·mol$^{-1}$.

31. The composition according to claim 1, wherein said one or more phthalate-free primary plasticizers are characterized by a molecular weight comprised between 350 and 800 g·mol$^{-1}$ and wherein said one or more phthalate-free secondary plasticizers are characterized by a molecular weight comprised between 150 and 600 g·mol$^{-1}$.

32. The composition according to claim 1, wherein said one or more phthalate-free primary plasticizers are characterized by a molecular weight comprised between 350 and 800 g·mol$^{-1}$ and wherein said one or more phthalate-free secondary plasticizers are characterized by a molecular weight comprised between 200 and 450 g·mol$^{-1}$.

33. The composition according to claim 1, wherein said one or more phthalate-free primary plasticizers are characterized by a dynamic viscosity at 20° C. comprised between 10 and 150 mPa·s and wherein said one or more phthalate-free secondary plasticizers are characterized by a dynamic viscosity at 20° C. comprised between 1 and 150 mPa·s.

34. The composition according to claim 1, wherein said one or more phthalate-free primary plasticizers are characterized by a dynamic viscosity at 20° C. comprised between 5 and 200 mPa·s, and wherein said one or more phthalate-free secondary plasticizers are characterized by a dynamic viscosity at 20° C. comprised between 5 and 120 mPa·s.

35. The composition according to claim 1, wherein said one or more phthalate-free primary plasticizers are characterized by a dynamic viscosity at 20° C. comprised between 10 and 150 mPa·s and wherein said one or more phthalate-free secondary plasticizers are characterized by a dynamic viscosity at 20° C. comprised between 5 and 120 mPa·s.

36. The composition according to claim 1, wherein the one or more phthalate-free primary plasticizers are characterized by a vapor pressure at 25° C. of less than $10^{-5}$ mm Hg, and wherein said one or more phthalate-free secondary plasticizers are characterized by a vapor pressure at 25° C. of less than $10^{-3}$ mm Hg.

37. The composition according to claim 1 wherein the one or more phthalate-free primary plasticizers are characterized by a vapor pressure at 25° C. of less than $10^{-5}$ mm Hg, and wherein said one or more phthalate-free secondary plasticizers are characterized by a vapor pressure at 25° C. of less than $10^{-2}$ mm Hg.

38. The composition according to claim 1, wherein the one or more phthalate-free primary plasticizers are characterized by a vapor pressure at 25° C. of less than $5 \cdot 10^{-6}$ mm Hg, and wherein said one or more phthalate-free secondary plasticizers are characterized by a vapor pressure at 25° C. of less than $10^{-4}$ mm Hg.

39. The composition according to claim 1, wherein the one or more phthalate-free primary plasticizers are characterized by a vapor pressure at 25° C. of less than $5 \cdot 10^{-6}$ mm Hg, and wherein said one or more phthalate-free secondary plasticizers are characterized by a vapor pressure at 25° C. of less than $10^{-3}$ mm Hg.

40. The composition according to claim 1, wherein the one or more phthalate-free primary plasticizers are characterized by a vapor pressure at 25° C. of less than $5 \cdot 10^{-6}$ mm Hg, and wherein said one or more phthalate-free secondary plasticizers are characterized by a vapor pressure at 25° C. of less than $10^{-2}$ mm Hg.

41. Decorative surface covering according to claim 13, said surface covering having a VOC (volatile organic compound) emission, lower than 10 μg·m$^{-3}$ measured after 28 days according to a test method based on ISO 16000-6, ISO 16000-9 or ISO 16000-10, wherein the VOC emission is equal to the sum of the TVOC (total volatile organic compound) emission, the SVOC (semi-volatile organic compound) emission and the formaldehyde emission.

\* \* \* \* \*